(12) United States Patent
Shukla et al.

(10) Patent No.: US 12,361,442 B2
(45) Date of Patent: Jul. 15, 2025

(54) METHOD AND SYSTEM FOR MANAGING CLEARANCE MARKDOWN

(71) Applicant: Target Brands, Inc., Minneapolis, MN (US)

(72) Inventors: Aishwarya Shukla, Karnataka (IN); Nishant Kalsi, Karnataka (IN); Narendra Yaddula, Karnataka (IN); Gayatri Pal, Karnataka (IN); Vivek S, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 266 days.

(21) Appl. No.: 18/182,250

(22) Filed: Mar. 10, 2023

(65) Prior Publication Data
US 2024/0303680 A1   Sep. 12, 2024

(51) Int. Cl.
G06Q 10/00       (2023.01)
G06Q 10/087      (2023.01)
(Continued)

(52) U.S. Cl.
CPC ....... *G06Q 30/0206* (2013.01); *G06Q 10/087* (2013.01); *G06Q 30/0202* (2013.01)

(58) Field of Classification Search
None
See application file for complete search history.

(56) References Cited

U.S. PATENT DOCUMENTS

| | | |
|---|---|---|
| 7,392,157 B1 | 6/2008 | Delurgio et al. |
| 7,529,703 B2 | 5/2009 | Benzschawel et al. |

(Continued)

FOREIGN PATENT DOCUMENTS

| | | |
|---|---|---|
| CN | 104966141 B | 9/2020 |
| TW | 581955 B | 4/2004 |
| WO | 2019089146 A1 | 5/2019 |

OTHER PUBLICATIONS

V Kuleshov, N Fenner, S Ermon (Accurate uncertainties for deep learning using calibrated regression) on machine learning, 2018—proceedings.mlr.press. (Year: 2018).*

(Continued)

*Primary Examiner* — Hafiz A Kassim
(74) *Attorney, Agent, or Firm* — Merchant & Gould P.C.

(57) ABSTRACT

Methods and systems for creation and management of a clearance schedule for in-store clearance of a retail item are disclosed. A markdown schedule may be generated using a first model representing a demand forecast and a second model that represents estimated price elasticity for the item to be placed into the clearance program. The estimated price elasticity may be determined from historical sales data of an identified past clearance item. In some instances, backtesting data may be generated from past clearance sales, and a comparison of the backtesting data to the current clearance program may be performed to update the markdown schedule. In some instances, updated sales data may be received, and model parameters updated. A user interface presenting a revised demand forecast may be generated, and a clearance schedule implementation tool may update the optimal markdown schedule for the inventory item for future periods of the clearance program.

16 Claims, 10 Drawing Sheets

(51) Int. Cl.
  *G06Q 30/0201* (2023.01)
  *G06Q 30/0202* (2023.01)

(56) References Cited

U.S. PATENT DOCUMENTS

| | | | |
|---|---|---|---|
| 7,580,852 | B2 | 8/2009 | Ouimet et al. |
| 9,785,411 | B2 | 10/2017 | Dunne et al. |
| 10,628,838 | B2 | 4/2020 | Ghosh et al. |
| 10,748,072 | B1 | 8/2020 | Seeger et al. |
| 10,997,614 | B2 | 5/2021 | Lei et al. |
| 11,120,361 | B1 | 9/2021 | Januschowski et al. |
| 11,144,844 | B2 | 10/2021 | Kurian |
| 11,238,482 | B1* | 2/2022 | Gaynor ............... G06Q 10/0875 |
| 2005/0256759 | A1* | 11/2005 | Acharya ................ G06Q 30/02 705/7.31 |
| 2006/0161504 | A1* | 7/2006 | Walser ............... G06Q 30/0206 705/400 |
| 2010/0185499 | A1* | 7/2010 | Dwarakanath ......... G06Q 10/04 705/7.31 |
| 2015/0317589 | A1 | 11/2015 | Anderson et al. |
| 2017/0169446 | A1* | 6/2017 | Li ...................... G06Q 30/0202 |
| 2017/0249650 | A1* | 8/2017 | Olsen .................... G06Q 30/06 |
| 2018/0082189 | A1 | 3/2018 | Cormier et al. |
| 2020/0104771 | A1 | 4/2020 | Popescu et al. |
| 2020/0111109 | A1* | 4/2020 | Lei ........................... G06N 3/08 |
| 2020/0184494 | A1* | 6/2020 | Joseph ................. G06F 18/214 |
| 2021/0224833 | A1 | 7/2021 | Lei et al. |
| 2021/0304243 | A1* | 9/2021 | Le ...................... G06Q 30/0205 |
| 2022/0414690 | A1* | 12/2022 | Stohr ..................... G06Q 10/04 |
| 2024/0257165 | A1* | 8/2024 | Lakhani ............... G06Q 10/087 |

OTHER PUBLICATIONS

Lin, Kyle Y., Dynamic pricing with real-time demand learning, European Journal of Operational Research, vol. 174, (Provided by Calhoun, Institutional Archive of the Naval Postgraduate School), Dated: 2006, 18 Pages.

Misiti, Michel et al., Optimized Clusters for Disaggregated Electricity Load Forecasting, Revstat—Statistical Journal, vol. 8, No. 2, Dated: Nov. 2010, 20 Pages.

Kaefer, Paul E., Transforming Analogous Time Series Data to Improve Natural Gas Demand Forecast Accuracy, Master's Theses—Dissertations, Theses, and Professional Projects (Marquette University), Dated: 2009, 84 Pages.

Mancuso, Paolo et al., A machine learning approach for forecasting hierarchical time series, Department of Industrial Engineering, University of Rome Tor Vergata, Italy; Department of Civil Engineering and Computer Science Engineering, University of Rome Tor Vergata, Italy; Dated: May 4, 2021, 44 Pages.

Pavlyshenko, Bohdan M., Machine-Learning Models for Sales Time Series Forecasting, Data, Dated: 2019, 11 Pages.

* cited by examiner

METHOD AND SYSTEM FOR MANAGING CLEARANCE MARKDOWN

BACKGROUND

Many retailers have both physical and online channels for selling inventory items. Clearance is a final sale mechanism used in both channels to reduce or eliminate remaining units of an inventory item. A markdown schedule for an inventory item being placed on clearance may include a set of price discounts and associated durations for the price discounts throughout the clearance program. Item demand and price elasticity of the inventory item may be informative in determining an optimal set of price discounts and associated durations thereof in order to maximize revenue while selling off the inventory item during a clearance program.

While the goal of clearance in the context of sales from a physical store is the same as online sales, there are significant differences in the operating behavior and data availability associated with a physical store. For example, timing and effort required for item repricing, item display inconsistencies due to reducing/nonreplenished stock, and various other conditions in-store (e.g., including demand behavior at the particular store location) may result in different clearance sales behavior. Thus, different and more complex techniques for modeling the item demand and price elasticity for the inventory item at the physical store are required. Additionally, predicating sales for an item that has never been in a clearance program before can be difficult. Accordingly, it can be difficult to visualize or model item demand for an inventory item for in-store clearance. It is with respect to these and other general considerations that embodiments have been described.

SUMMARY

In general, the present disclosure relates to methods and systems for generation and management of clearance schedules, for example for use at retail locations of a retailer. In examples, a markdown schedule may be generated using a first model representing a demand forecast and a second model that represents estimated price elasticity for the item to be placed into the clearance program. The estimated price elasticity may be determined from historical sales data of an identified past clearance item. In some instances, backtesting data may be generated from past clearance sales, and a comparison of the backtesting data to the current clearance program may be performed to update the markdown schedule. In some instances, updated sales data may be received, and model parameters updated. A user interface presenting a revised demand forecast may be generated, and a clearance schedule implementation tool may update the optimal markdown schedule for the inventory item for future periods of the clearance program.

In a particular aspect, a method for managing an inventory item for in-store clearance is provided. The method includes receiving, at a clearance schedule tool, a selection of an inventory item for clearance, accessing, at the clearance scheduling tool, historical sales data for the inventory item for a predetermined time period before a start of a clearance program, and using the historical sales data, identifying a demand local maxima for the inventory item. The method also includes, based on the demand local maxima, filtering the historical sales data to include data between the demand local maxima and the start of the clearance program, and, based on the filtered historical sales data, building a first model that represents a demand forecast for the inventory item during the clearance program. The method further includes generating a continuous time series representing the demand forecast for the inventory item during the clearance program as determined using the first model, sending instructions to the clearance schedule implementation tool to implement an optimal markdown schedule for the inventory item based on the demand forecast for the inventory item during the clearance program, and dynamically receiving, at the clearance schedule tool, updated sales data for the inventory item during the clearance program, wherein the clearance schedule tool includes an automated feedback dataflow that continuously accesses sales data for the inventory item during the clearance program and receives updates based on changes to sales data. The method includes, in response to receiving updated sales data, updating at least one parameter of the first model, and outputting, on the user interface, a revised continuous time series representing a revised demand forecast for the inventory item during the clearance program as determined using the first model with the updated at least one parameter. The method further includes sending instructions to the clearance schedule implementation tool to implement an updated optimal markdown schedule for the inventory item based on the revised demand forecast for the inventory item during the remainder of the clearance program.

In a second aspect, a system for managing an inventory item for clearance is provided. The system includes a computing system including a processor, and a memory communicatively coupled to the processor. The memory stores instructions executable by the processor to: receive, at a clearance schedule tool, a selection of an inventory item for clearance; access, at the clearance scheduling tool, historical sales data for the inventory item for a predetermined time period before a start of a clearance program; using the historical sales data, identify a demand local maxima for the inventory item; based on the demand local maxima, filter the historical sales data to include data between the demand local maxima and the start of the clearance program; based on the filtered historical sales data, build a first model that represents a demand forecast for the inventory item during the clearance program; output, on a user interface having a selectable feature configured to launch a downstream clearance schedule implementation tool, a continuous time series representing the demand forecast for the inventory item during the clearance program as determined using the first model; send instructions to the clearance schedule implementation tool to implement an optimal markdown schedule for the inventory item based on the demand forecast for the inventory item during the clearance program; dynamically receive, at the clearance schedule tool, updated sales data for the inventory item during the clearance program, wherein the clearance schedule tool includes an automated feedback dataflow that continuously accesses sales data for the inventory item during the clearance program and receives updates based on changes to sales data; in response to receiving updated sales data, update at least one parameter of the first model; output, on the user interface, a revised continuous time series representing a revised demand forecast for the inventory item during the clearance program as determined using the first model with the updated at least one parameter; and send instructions to the clearance schedule implementation tool to implement an updated optimal markdown schedule for the inventory item based on the revised demand forecast for the inventory item during the remainder of the clearance program.

In a third aspect, a method for managing an inventory item for clearance is provided. The method includes receiving, at a clearance schedule tool, a selection of an inventory item for clearance, accessing, at the clearance scheduling tool, historical sales data for the inventory item for a predetermined time period before a start of a clearance program, and using the historical sales data, identifying a demand local maxima for the inventory item. The method further includes, based on the demand local maxima, filtering the historical sales data to include data between the demand local maxima and the start of the clearance program, and, based on the filtered historical sales data, building a first model that represents a demand forecast for the inventory item during the clearance program. Building the first model includes splitting the filtered historical sales data into training data and testing data; using the training data to calculate optimal values for parameters of the first model; and in response to calculating optimal values for parameters of the first model, testing the first model with the testing data. The method further includes outputting, on a user interface having a selectable feature configured to launch a downstream clearance schedule implementation tool, a continuous time series representing the demand forecast for the inventory item during the clearance program as determined using the first model, and sending instructions to the clearance schedule implementation tool to implement an optimal markdown schedule for the inventory item based on the demand forecast for the inventory item during the clearance program. The method also includes dynamically receiving, at the clearance schedule tool, updated sales data for the inventory item during the clearance program, wherein the clearance schedule tool includes an automated feedback dataflow that continuously accesses sales data for the inventory item during the clearance program and receives updates based on changes to sales data and, in response to receiving updated sales data, updating at least one parameter of the first model. The method includes outputting, on the user interface, a revised continuous time series representing a revised demand forecast for the inventory item during the clearance program as determined using the first model with the updated at least one parameter, and sending instructions to the clearance schedule implementation tool to implement an updated optimal markdown schedule for the inventory item based on the revised demand forecast for the inventory item during the remainder of the clearance program. The method further includes concurrently displaying, on the user interface, a graphical representation of the continuous time series and the revised continuous time series.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
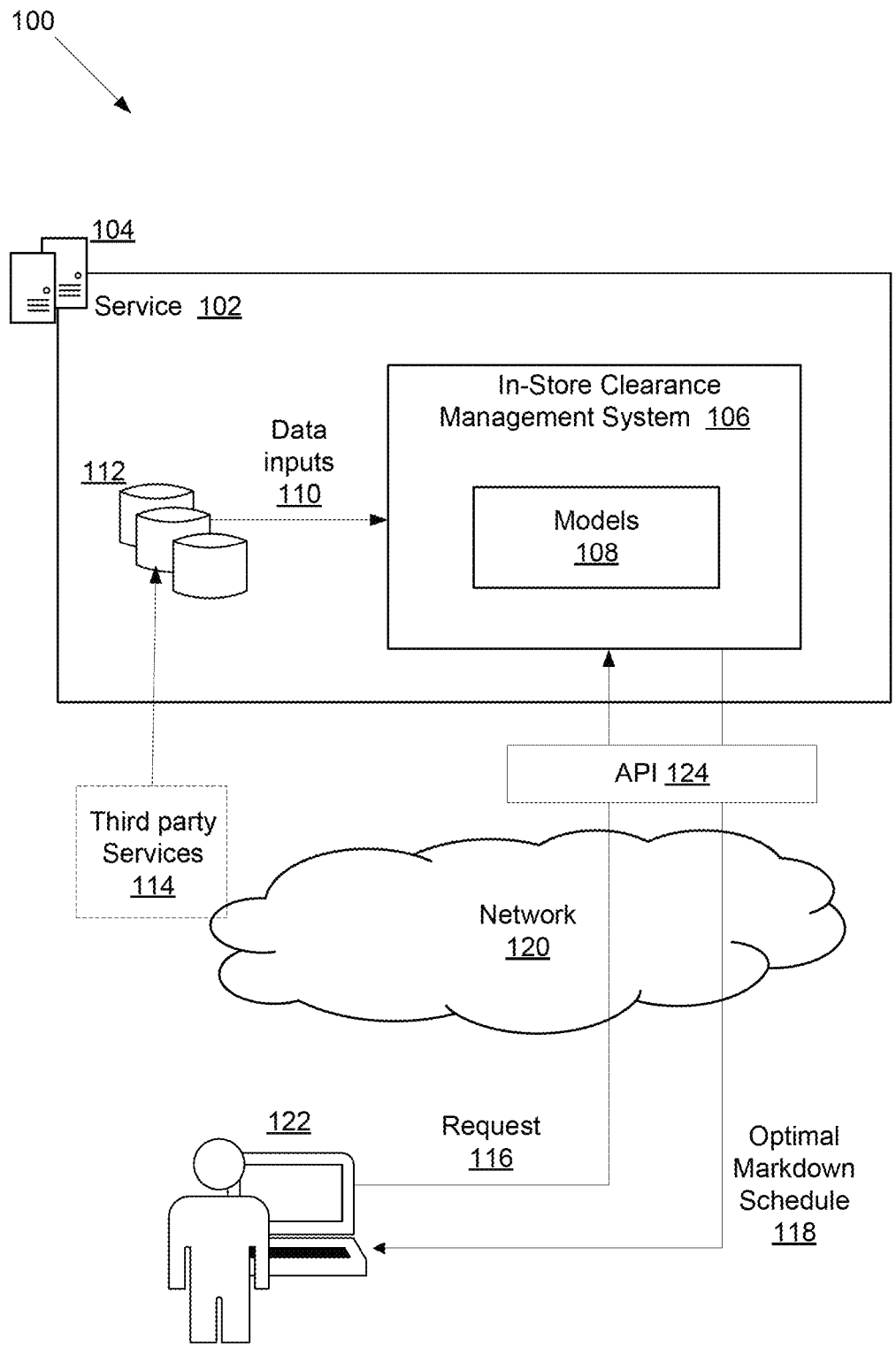
FIG. 1 illustrates an example network environment where a system for managing clearance items at physical retail stores may be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

As briefly described above, embodiments of the present invention are directed to managing clearance programs for inventory items at physical stores of a retailer. Clearance is a final sale mechanism used in both physical stores and online channels to maximize revenue while reducing or eliminating remaining units of inventory. To accomplish this, prices are reduced according to a markdown schedule to drive inventory levels towards zero by the predetermined date while maximizing revenue at the same time.

A clearance scheduling system as described herein utilizes a clearance schedule tool to build a first model representing a forecasted demand for an inventory item during a clearance program based on pre-clearance sales data for the inventory item. A second model may be built that represents an estimated price elasticity of the inventory item during a clearance item. Because the inventory item for clearance may not have been put on clearance before, there may no historical clearance sales data for the inventory item. Therefore, the second model may be built using historical clearance sales data for a plurality of related inventory items. The historical clearance sales data for the related inventory items used to build the second model may be based on a matching process used to identify related inventory items most similar to the inventory item for clearance. The second price elasticity model may be applied to the first demand forecast model to generate an optimization model. A backtesting process may be used to built trust in the optimization model by estimating performance against historical clearance markdown schedules that were actually implemented. Iterative updates to the optimization model may occur during backtesting until a predetermined capture rate is met. Using the forecasted demand as predicted by the optimization model, an optimal markdown schedule for the inventory item during the clearance program may be selected and implemented. In examples, during the clearance program, the clearance schedule tool may receive actual sales data for the inventory item. Based on the received actual sales data, the demand forecast may be revised and updated to more accurately reflect the actual demand of the inventory item as reflected by the actual sales data. By revising the demand forecast during the clearance program, the accuracy of predicted demand is improved, which may lead to selection of an updated optimal markdown schedule that will increase the revenue obtained for the inventory item during the clearance program.

FIG. 1 illustrates an example network environment 100 where a system 106 for managing in-store clearance items may be implemented. The system 100 may be an in-store clearance management system hosted by a service 102. In some examples, the service 102 may be associated with a retailer. The retailer may have at least one or more physical stores through which a plurality of inventory items are sold. In some instances, the retailer is a nationwide retailer having a plurality of physical stores, with different ones of the physical stores carrying a different selection of items, and each having its own sales performance based on local item demand. The retailer may also have an online store in addition to the physical store(s). One or more servers or processors 104 may be operable to execute one or more components of the service 102, including the system.

As described in greater detail with reference to FIGS. 2-5 below, the system 106 may build and train models 108 that can then be applied to facilitate forecasting or prediction of item demand for inventory items being placed on clearance at the physical stores of the retailer. The models may be built and trained using data inputs 110 received from one or more data stores 112 of the service 102. In some examples, a model 108 may be built for every inventory item of the retailer on a per-store basis that will be put on clearance. A first model may be built representing a demand forecast for a current inventory item during a clearance program. The demand forecast during the clearance program may be predicted based on historical sales data for the current inventory item in the weeks leading up to the clearance program. A second model representing an estimated price elasticity for the current inventory item may be applied to the first model to generate an optimization model. The price elasticity may be predicted based on historical sales data for past clearance items. The optimization model reflects a forecasted demand for the current inventory item for clearance that considers how demand for the inventory item may change based on a reduction in price throughout the clearance program. The generation of the first forecasting model, the second price elasticity model, and the optimization model are described in greater detail with respect to FIG. 3 below. The models may also be back-tested to build trust in the models, and the backtesting process is described in greater detail with respect to FIG. 4 below. The models 108 may be stored in association with the respective inventory items and the physical stores to facilitate retrieval and application of the models 108 when selecting an optimal markdown schedule. In some examples, the models may be stored internally within a database system 106 or service 102. In other examples, the models may be stored externally in a database hosted by, for example, a third party storage server or system. In some examples, the models may be accessed during the clearance program and updated based on actual clearance data for the inventory item.

In response to the system 106 receiving a request 116 for a markdown schedule for an inventory item that is to be placed on clearance at one or more physical retail stores, an optimal markdown schedule 118 may be determined for the clearance item at each of the one or more physical retail stores. For example, the request may indicate the current inventory item is being placed on clearance in all physical stores, in a subset of physical stores, or a single physical store. In response, an optimal markdown schedule 118 for the current inventory item is generated for each physical store indicated. The optimal markdown schedule 118 may include a set of discount prices and associated durations thereof for an entirety of the clearance duration of the item at the respective physical store.

The optimal markdown schedule 118 may be based, at least in part, on the forecasted demand for the inventory item during the clearance program. However, because inventory items being placed on clearance are most often end-of-life items that have not previously been on clearance, no historical clearance sales data specific to the current inventory item may be available for use in predicting the item's price sensitivity during clearance. Therefore, historical clearance sales data for a past clearance item (e.g., actual clearance data) may be used to adjust the demand forecast based on an estimated price elasticity in order to more accurately predict demand for the current inventory item during clearance, wherein the past clearance item may have similar attributes to the current inventory item heading for clearance. Based, at least in part, on the forecasted demand as reflected in the optimization model, an optimal markdown schedule 118 may be selected from a plurality of potential markdown schedules for the current inventory item at a retail store. Alternative embodiments for optimization of a markdown schedule for inventory items at a physical retail store are described in U.S. patent application Ser. No. 16/835,917, the entirety of which is incorporated by reference herein.

In some examples, one or more of the data inputs 110 used to build the models 108 and/or facilitate the forecasting or demand prediction may be generated internally by the service 102 and subsequently stored in the data stores 112. In other examples, one or more of the data inputs 110 may be generated externally by third party services 114 and provided to the service 102 for storage in the data stores 112. The data inputs 110 may include price data, item sales data, inventory data, item data, and store data, among other similar types of data, associated with a plurality of inventory items at a plurality of physical retail stores. Price data may include a number of units of an inventory item sold at a particular price. Item sales data may include a number of units of an inventory items sold. Inventory data may include a number of remaining units of an inventory item. Item data may include information about the inventory item, including product hierarchy information associated with the inventory item and item attribute data. Store data may include information about a physical store, such as a geographical location of a store or a stock-to-sales ratio associated with the store, among other information. The data inputs 110 may also include program metadata. In some examples, the program metadata may be retrieved from the request 116, and may include business rules associated with a clearance program. Example business rules may include a duration of the clearance program, a timing between price discount changes, a minimum and maximum number of allotted discount changes throughout the duration, or any constraints on discount values, among other examples. Business rules may also be associated with consumer protection laws or rules, which may vary based on the states in which the physical stores are located. The data inputs 110 may further include historical clearance sales data associated with past clearance items. The historical clearance sales data may include similar data described above, such as price data, item sales data, inventory data, item data, store data, and program data associated with past clearance items. In some examples, each type of data may be stored in separate data stores 112. In other examples, the various types of data may be combined in one or more of the data stores 112.

In one embodiment, the service 102 may interoperate with various applications to enable a user affiliated with the retailer (e.g., a physical retail store manager) to submit the request 116 to and subsequently receive the optimal markdown schedule 118 from the system 106 as a response over a network 120. For example, a user may execute a thin version of an application (e.g., a web browser) or a thick version of the application (e.g., a locally installed application) through a device 122. The device 122 may include a desktop computer, a laptop computer, a tablet computer, a smart phone, or wearable computing device, among other similar devices. An application programming interface (API) 124 may facilitate communication between the service 102 and the device 122 over one or more networks, such as the network 120. For example, receipt of the request 116 at the API 124 may cause the API 124 to trigger a forecasting or prediction phase of the system 106. In examples the user may receive the optimal markdown schedule 118 through a display on a user interface.

Figure 2:
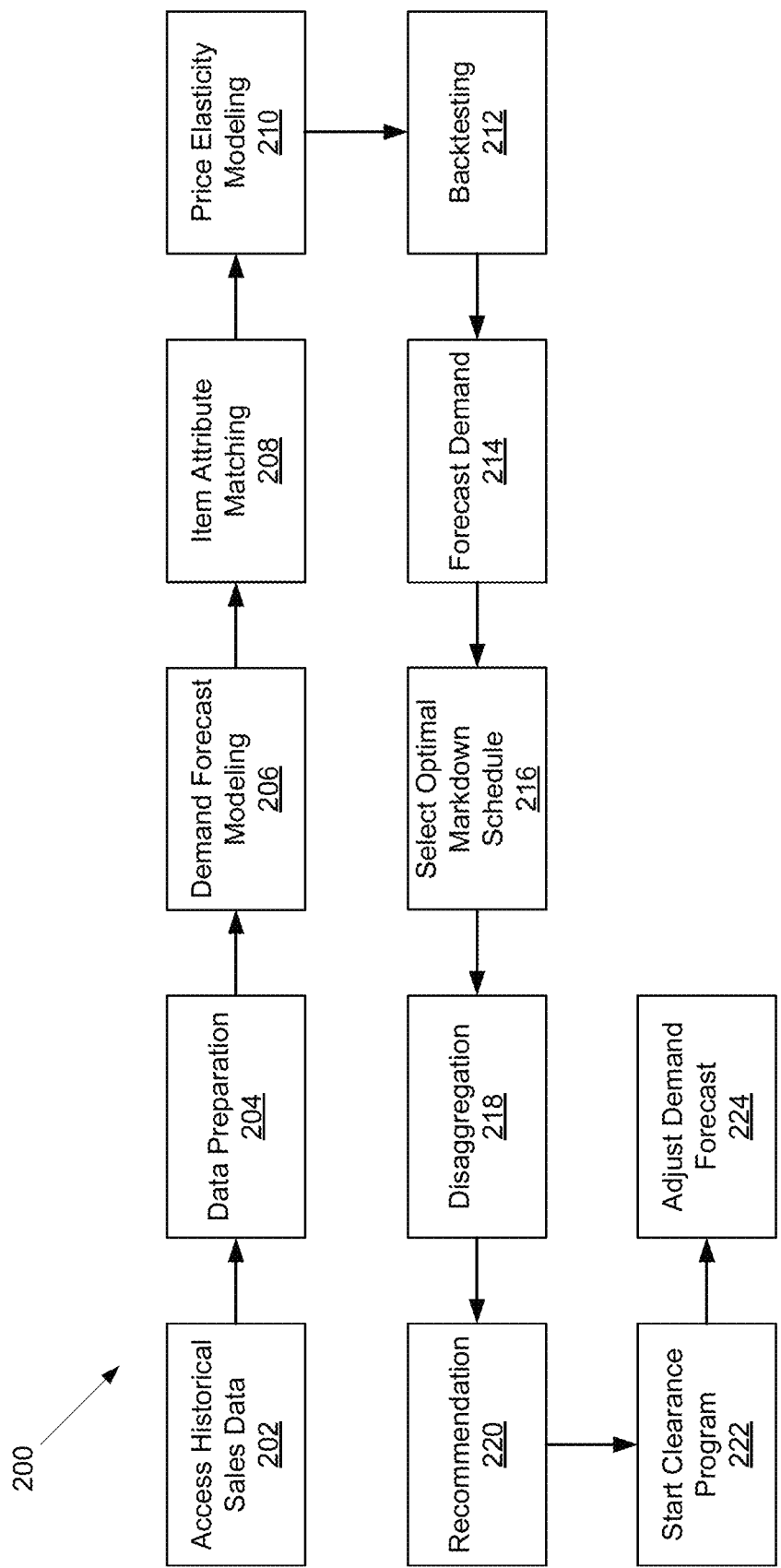
FIG. 2. is a conceptual diagram illustrating example phases of the in-store clearance management system.

FIG. 2. is a conceptual diagram 200 illustrating example phases of the in-store clearance management system 106 described in detail above with reference to FIG. 1. The example phases include accessing historical sales data 202, data preparation 204 to prepare the historical sales data for modeling, demand forecast modeling 206, item attribute matching 208 to identify a past clearance item similar to a current inventory item heading for clearance, price elasticity modeling 210, backtesting 212 to build trust in the models, forecasting demand 214, selecting an optimal markdown schedule 216, disaggregation 218, outputting a recommendation 220, the start of the clearance program for the current inventory item 222, and adjusting the demand forecast 224 during the clearance program.

After a request for a markdown schedule for an inventory item heading into clearance is received at the in-store clearance management system 106, the system may enter the access historical sales data phase 202. During phase 202, historical sales data for the current inventory item may be accessed. The historical sales data may be organized on a weekly basis. In examples, historical sales data for the current inventory item for a predetermined number of weeks leading up to the start of a clearance program may be accessed. For example, historical sales data for the current inventory item for the twelve-week period leading up to the start of the clearance program may be accessed. During the phase of accessing historical sales data 202, historical sales data for past clearance items may be accessed. The historical sales data for past clearance items may include price data, item sales data, inventory data, and store data, among other similar types of data, associated with a plurality of inventory items on clearance at a plurality of physical retail stores. The historical sales data for past clearance items may be organized by department.

The historical sales data may then be prepared for modeling during the data preparation phase 204. The data preparation phase 204 includes basic data cleaning, such as adjusting for outliers, correcting incorrect data (e.g., wrong prices), and replacing null values. For example, historical sales data for partial weeks may be removed from the data to be used for modeling. In some examples, historical sales data for weeks containing a holiday may be removed. A program length filter may be applied to remove historical sales data for past clearance items in a clearance program that differs in length from the length of the clearance program for the current inventory item. Additionally, historical sales data may be aggregated at an item-cluster level.

Pretreated data from the data preparation phase 204 may be then used in the demand forecast modeling phase 206 to forecast demand for the current inventory item during the clearance program. Using the pretreated historical sales data for the inventory item, a first model that represents a demand forecast for the inventory item during the clearance program may be built. The generation of the first forecasting model is described in greater detail with respect to FIG. 3 below.

Next, the system enters the item attribute matching phase 208. Generally an inventory item is only on clearance once, so there is typically no historical clearance sales data for the current inventory item heading towards clearance. Therefore, the item attribute matching phase 208 is used to match the current clearance item with past clearance items so that historical clearance sales data of similar past clearance items may be used to estimate a price elasticity for the current inventory item during clearance. During the item attribute matching phase 208, past clearance items within the same department as the current inventory item may be identified as candidate items to be considered as "similar" from which to draw information regarding clearance sales behavior. An assumption may be made that items within the same department having the same clearance program length have similar sales behavior at the same time of the year. If there are no past clearance items or an insufficient number of clearance items within the same department as the inventory item, past clearance items from other departments may be identified as candidate items based on the length of the clearance program and the time of year of the clearance program.

In some examples, a single past clearance item may be identified as matching the current inventory item. In other examples, a plurality of past clearance items may be identified as matching the current inventory item. The similarity between a past clearance item and the current inventory item may be evaluated based on a comparison of item attributes. Moreover, the similarity between a past clearance item and a current inventory item may be defined by a Manhattan distance measure given in equation (1) below:

$$S_{12} = W_1 * \text{abs}(I_1 - I_2) + W_2 * \text{abs}(Q_1^A - Q_2^A) + W_3 * \text{abs}(STS_1 - STS_2) \quad (1)$$

TABLE 1

Variable Definitions for Equation (1)

| Variable | Definition |
|---|---|
| $S_{12}$ | Similarity between two items |
| i | Item index |
| w | Index for the week on clearance, w ∈ [0, L − 1] |
| $I_i$ | Cluster normalized inventory of item i |
| $Q_i^A$ | Cluster normalized sales of item i |
| $STS_i$ | Cluster normalized stock-to-sales ratio of item i |
| $W_{3i}$ | Weight for each feature in calculating distance $\{W_1 = 1.0, 2 = 0.6, 3 = 0.6\}$ |

The historical clearance data for the similar past clearance item(s) may then be used to estimate price elasticity for the current inventory item during clearance in the price elasticity modeling phase 210. A second model is built to capture the price elasticity component of item demand. The second model may be a log-log regression model. The generation of the second price elasticity model is described in greater detail with respect to FIG. 3 below.

Following the modeling phases, the system enters the backtesting phase 212. The backtesting phase may be used to build trust in the models prior to utilizing the models to forecast item demand. The objective of backtesting is to understand how the models will perform on historical completed clearance programs. The backtesting phase 212 is used to estimate performance against historical clearance markdown schedules that were actually implemented. The backtesting phase 212 is described in greater detail with respect to FIG. 4 below. Based on results from the backtesting phase 212, the models may be updated prior to the system entering the forecast demand phase 214.

During the forecast demand phase 214, the demand for the current inventory item during the clearance program is predicted. The second model representing the estimated price elasticity may be applied to the first model representing the demand forecast to generate an optimization model. Applying the second model to the first model to forecast demand may generate a more accurate demand forecast due to consideration of the increase in demand due to markdowns during the clearance program. The demand forecast may be generated at the item cluster level.

Optimization phase 216 includes selecting an optimal markdown schedule. The goal of the optimization phase 216 is to find the optimal markdown schedule for an in-store clearance program for the current inventory item. An optimizer may be used to select an optimal markdown schedule. The inputs to the optimizer may consist of unconstrained forecasts at the item cluster level as determined by the demand forecast generated in phase 214, regular price and initial inventory information for each item cluster, and optimization parameters and constraints. The optimization parameters are shown in Table 2 below.

TABLE 2

| Optimization Parameters | |
|---|---|
| Parameter | Definition |
| past-markdowns | List of markdowns applied previously in the program Default: empty |
| no_new_markdown_weeks | List of weeks that should not be marked down Default: empty |
| min_markdowns | Minimum number of markdowns required during clearance Default: 0 |
| max_markdowns | Maximum number of markdowns allowed during clearance Default: 100 |
| min_markdown_percent_change | Minimum markdown percent increase from one week to the next Default: 0 |
| max_markdown_percent_change | Maximum markdown percent increase from one week to the next Default: 65 |
| gamma | Desired sell-through rate Default: 0.7 |
| possible_markdowns | List of all valid markdown values Default: [0, 30, 50, 70] |
| markdown_lower_bounds | List of weekly minimum markdowns Default: empty |
| markdown_upper_bounds | List of weekly maximum markdowns Default: empty |

TABLE 2-continued

| Optimization Parameters | |
|---|---|
| Parameter | Definition |
| force_markdown_week | Week for which markdown has to be more than 0 Default: 3 |
| salvage_revenue_percentage | Percent of regular price at which item would be salvaged Default: 8 |
| minimize_salvage | If true, maximize sell-through Default: false |

The optimizer uses the optimization parameters in the optimization phase 216 to identify all feasible markdown schedules for the clearance program. In an example, the optimizer may carry out the following sequence of actions: 1) identify all non-decreasing schedules; 2) apply min_markdowns constraint; 3) max_markdowns; 4) apply min_markdown_percent_change; 5) max_markdown_percent_change; 6) apply force_markown_week constraint, markdown_lower_bounds constraint, and markdown_upper_bounds constraints; 7) apply no_new_markdown_weeks constraint, apply gamma constraint. The optimizer may then perform a full grid search on all feasible markdown schedules. The grid search may run through all feasible schedules sequentially and output the schedule that maximizes an objective function value, wherein the objective function is a measure of how a schedule performs for an item cluster. The objective function may be determined using equation (2):

$$f = s + sv - hmp - tsp \qquad (2)$$

wherein "s" represents total sales revenue, "sv" represents total salvage venue, "hmp" represents a high markdown penalty to give higher preference to schedules with lower markdown values, and "tsp" ~ represents a total salvage penalty. The markdown schedule that maximizes the objective function "F" may be identified as the optimal schedule for an item cluster.

Because forecast demand phase 214 forecasts demand at an item-cluster level, disaggregation phase 218 disaggregates the forecasted demand to each store in the cluster. In examples, the disaggregation phase 218 may first compute an average demand ratio of a store to its cluster to a predetermined time period (e.g., twelve months). Individual demand attributable to each store may then be distributed to each store, and store inventory levels used to bound demand levels to get disaggregated constrained demand.

A recommendation may be provided in phase 220 for implementing the optimal markdown schedule identified in phase 216. In examples, the recommendation may be based on data captured in the backtesting phase 212. The recommendation may be output on a user interface. An example user interface including a recommendation for implementing the optimal markdown schedule is described in greater detail with respect to FIG. 6 below.

The clearance program for the current inventory item begins at clearance phase 222. Following the start of the clearance program at clearance phase 222, the in-store clearance management system 106 may collect sales data for the current inventory item during the clearance program. The collected sales data for the current inventory item during the clearance program may be used to adjust the demand forecast during adjustment phase 224. During the adjustment phase 224, the forecasted demand may be adjusted based on actual sales of the current inventory item during the clearance program. The adjustment of the forecasted demand based on actual sales during a clearance program is described in greater detail below with respect to FIG. 7 and FIG. 9.

Figure 3:
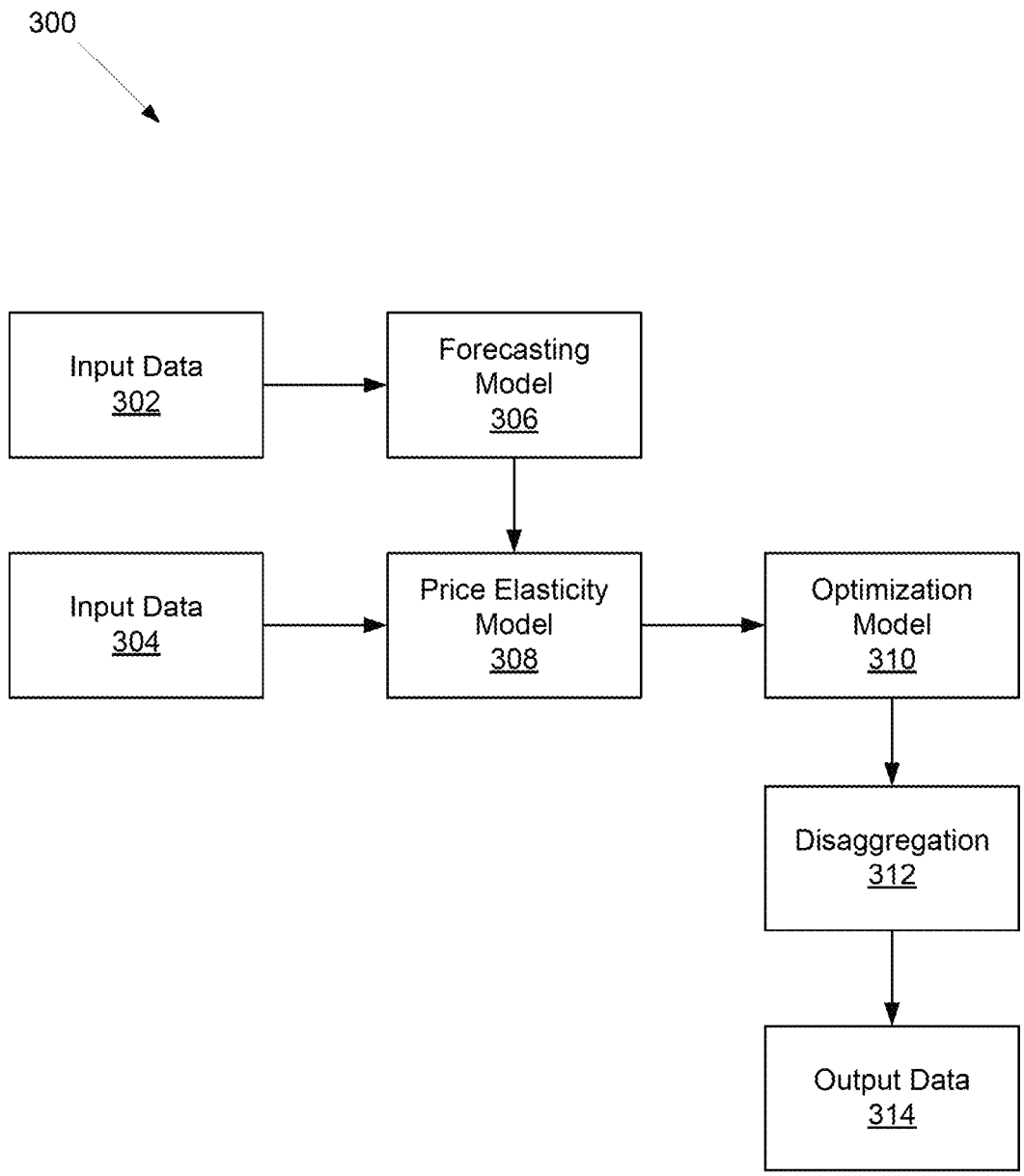
FIG. 3 is a is a conceptual diagram illustrating the modeling phase of the in-store clearance management system.

FIG. 3 is a is a conceptual diagram illustrating the modeling phase 300 of the in-store clearance management system. The modeling phase 300 includes the demand forecast modeling phase 206 and the price elasticity modeling phase 210 as described with respect to FIG. 2 above. Input data 302 may be input to the forecasting model 306. The input data 302 may include pre-clearance historical sales data for the current inventory item, previous season clearance data for other inventory items, seasonality information, and clearance program duration.

In examples, the pre-clearance historical sales data for the inventory item for a predetermined period of time leading up to the start of the clearance program (e.g., twelve weeks) is included in the input 302 to the forecasting model 306, and a local maxima in the time series sales trend data is identified. For example, where a time period of twelve weeks leading up to clearance is analyzed, the local maxima showing peak sales may be identified at eight weeks before the start of clearance. Based on the identified local maxima reflecting peak sales leading up to the start of clearance, the time series sales trend data may be filtered to only include the data points between the local maxima point and the clearance program start data. In examples, at least five weeks for data points are used as input to the model to prevent bias resulting from the local maxima being too close to the start of the clearance program date.

Using the filtered time series sales data, a forecasting model that represents a demand forecast for the inventory item during the clearance program may be built. A damped trend exponential smoothing model may be used to derive a dynamic trend, a smoothing factor, and a damping factor used to compute the baseline demand forecast for the inventory item during the clearance program. In examples, the following equations may be used:

$$lt = \alpha yt + (1-\alpha)(lt-1 + \varphi bt - 1) \quad (3)$$

$$bt = \beta(lt - lt - 1) + (1-\beta)\varphi bt - 1 \quad (4)$$

$$yt + 1 = lt + bt \quad (5)$$

In equations (3), (4), and (5), "yt" is the time series value at time "t" and contains actual values during model training with forecasts appended for a future time period. "lt" denotes an estimate of the starting point for the next predictions of the time series at "t" lt=0 for t=0. "bt" denotes an estimate of the trend (e.g., slope) of the time series at time "t" bt=0 for t=0. "α" denotes the smoothing parameter for the level 0≤α≤1. "β" denotes the smoothing parameter for the trend 0≤β≤1. "φ" denotes the damping factor for the trend 0≤φ≤1. The output of the forecasting model is not a point forecast, but a continuous time series through the end of the clearance program for the inventory item.

Input data 304 may also be input to the price elasticity model 408. The input data 304 may include regular price data, clearance program duration, and markdown percentages. A price elasticity model may be built for each item-month combination. The price elasticity model may be a mixed effects model, wherein the fixed effects (i.e., coefficients) are at the department-month level and the random effects are at the item-cluster level. Final coefficients at the item-cluster level may be the sum of the fixed and random coefficients. Equation (6) presents an equation for modeling price elasticity:

$$\log \hat{D} = \log D_W^B + \beta_p \log\left(\frac{P_W^M}{P_0}\right) + \beta_0 + \epsilon, \ \epsilon \sim N\left(0, \left[\frac{P_W^M}{P_0}\right]\sigma_\epsilon^2\right) \quad (6)$$

TABLE 3

Variable Definitions for Equation (6)

| Variable | Definition |
| --- | --- |
| $\hat{D}$ | Unconstrained average clearance forecasting demand of the week w |
| $D_W^B$ | Unconstrained average baseline demand of the week w |
| $P_W^M$ | Discounted price in week w; $P_W^M = (1 - M)P_0$ |
| M | Markdown percentage; M ∈ [0, 0.15, 0.30, 0.50, 0.70] |
| $P_0$ | Regular price of the item |
| $\beta_p$ | Coefficient of price feature |
| $\beta_0$ | Intercept of the model |
| $\epsilon$ | Error term. |

The price elasticity model 308 may be applied to the forecasting model 306 to generate an optimization model 310. Therefore, the optimization model 310 reflects the forecasted demand for the current inventory item for clearance including the effect of lowering the price on the demand. The optimization model represents demand forecast at the item cluster level, so must be disaggregated 312. The output data 314 of the optimization model may also be a continuous time series through the end of the clearance program for the inventory item.

Figure 4:
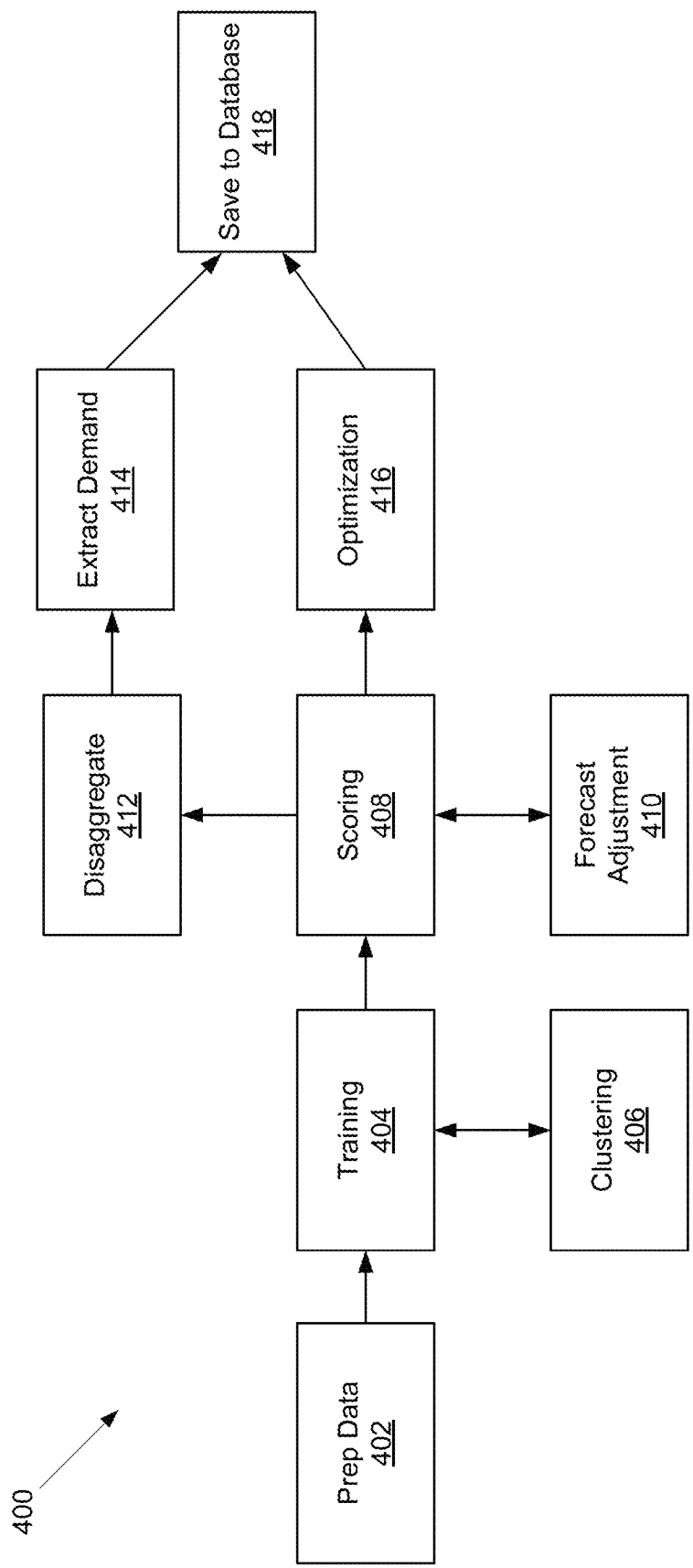
FIG. 4 is a conceptual diagram illustrating the backtesting phase of the in-store clearance management system.

FIG. 4 is a conceptual diagram 400 illustrating the backtesting phase of the in-store clearance management system. Backtesting may be used for building trust in the models for use in managing clearance items at physical retail stores by understanding how the models perform on historical data from completed clearance programs. In examples, the backtesting workflow is used to estimate performance against the historical clearance program markdowns that were actually implemented. For example, if a clearance program had given a markdown of [0, 30, 30, 50] for a 4 week program, then a model forecasting the same schedule may be generated and results may be compared against actual outcomes of the implemented clearance program.

At phase 402 data may be gathered and prepared for backtesting. In examples, all data, including markdowns, forecasts, actual sales values, and inventory levels at each location may be gathered from clearance program markdown systems. Data may be gathered at, or aggregated to, a program-location-week level. A training phase 404 may also be run each time a backtesting workflow is run. Appropriate clusters may be generated as needed at phase 406. During the scoring phase 408, demand forecasts predicted using the optimization model are scored against actual outcomes of an implemented clearance program. At phase 410, a forecast adjustment may be applied to account for the entire length of a clearance program. For example, at week 0 of a clearance program, no forecast adjustment may be needed. At week 1 of a clearance program, a forecast adjustment factor may be calculated based on the scoring from week 1, and the week 1 score may be adjusted by that factor. Based, at least in part, on the scoring phase 408, the optimization model for predicting demand forecast may be optimized during phase 416. The optimization model may be iteratively updated until the comparison of the backtesting data with the actual sales data indicates that a predetermined capture rate is met. The backtesting results may be stored and saved to a database at phase 418. Information that may be saved at phase 418 include data accuracy of the data generated from the optimization model compared to actual clearance program data, financial performance, and forecast accuracy. The backtesting data may be used be the retail enterprise to assign a level of trust to a model. Trust levels may include high confidence, where minimal user interventions are expected, medium confidence, where some user interventions may be needed, and low confidence, where higher levels of user intervention is expected. Moreover, at phase 412 the actual clearance program data may be disaggregated for all possible clearance schedules so that demand may be extracted on a per-clearance schedule basis at phase 414. The extracted demand from the actual clearance schedule data may also be saved at phase 418.

Figure 5:
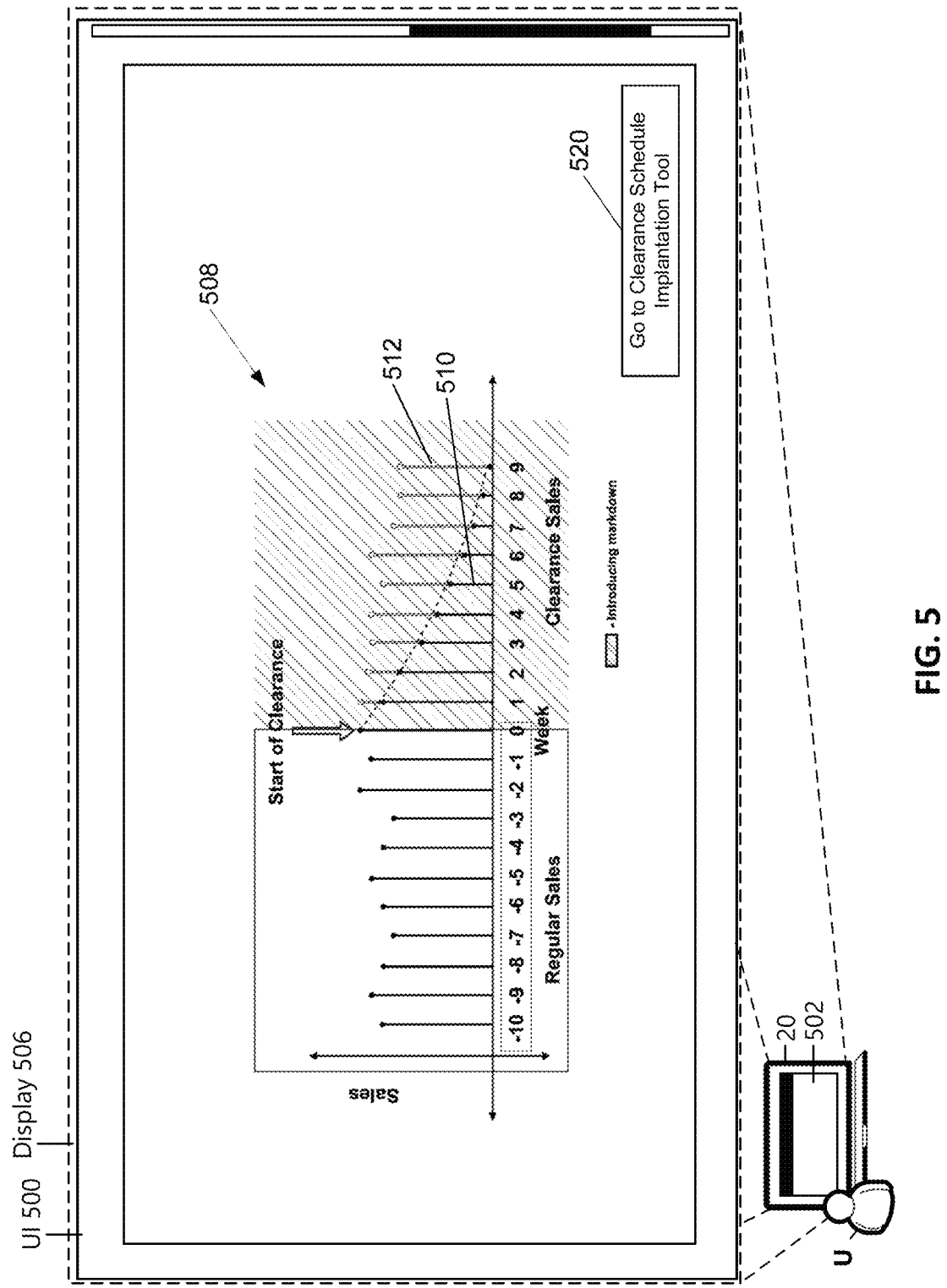
FIG. 5 illustrates an example user interface displaying an output from the in-store clearance management system.

FIG. 5 illustrates an example user interface 500 displaying an output from the in-store clearance management system. The user interface 500 may be presented on a screen 502 of a computing device 20. The user interface may be presented on a display 506 such as a touch screen display. A graphical representation 508 of sales for an item prior to the start of a clearance program and throughout a clearance program may be displayed. For example, using actual sales data of an inventory item, regular sales data for the ten weeks leading up to the start of clearance may be displayed. Based on the selected optimal markdown schedule, the predicted sales of the inventory item during the clearance program may be displayed 510, and the price elasticity according to the second price elasticity model may be reflected to adjust the predicted sales 512 to account for the increase in demand because of the markdown. In examples, the predicted sales of the inventory item during the clearance program may be the predicted sales of the inventory item during the clearance program at a specific physical retail store, wherein the predicted sales are determined following disaggregation of a forecasted demand to each store in a cluster. The user interface 500 may also include a selectable input 520 to launch a downstream clearance schedule implementation tool for implementing the optimal markdown schedule. The user interface 500 may be further configured to receive a selection of a specific physical store location at which to implement the optimal markdown schedule after disaggregation of the forecasted demand to an item store level.

Figure 6:
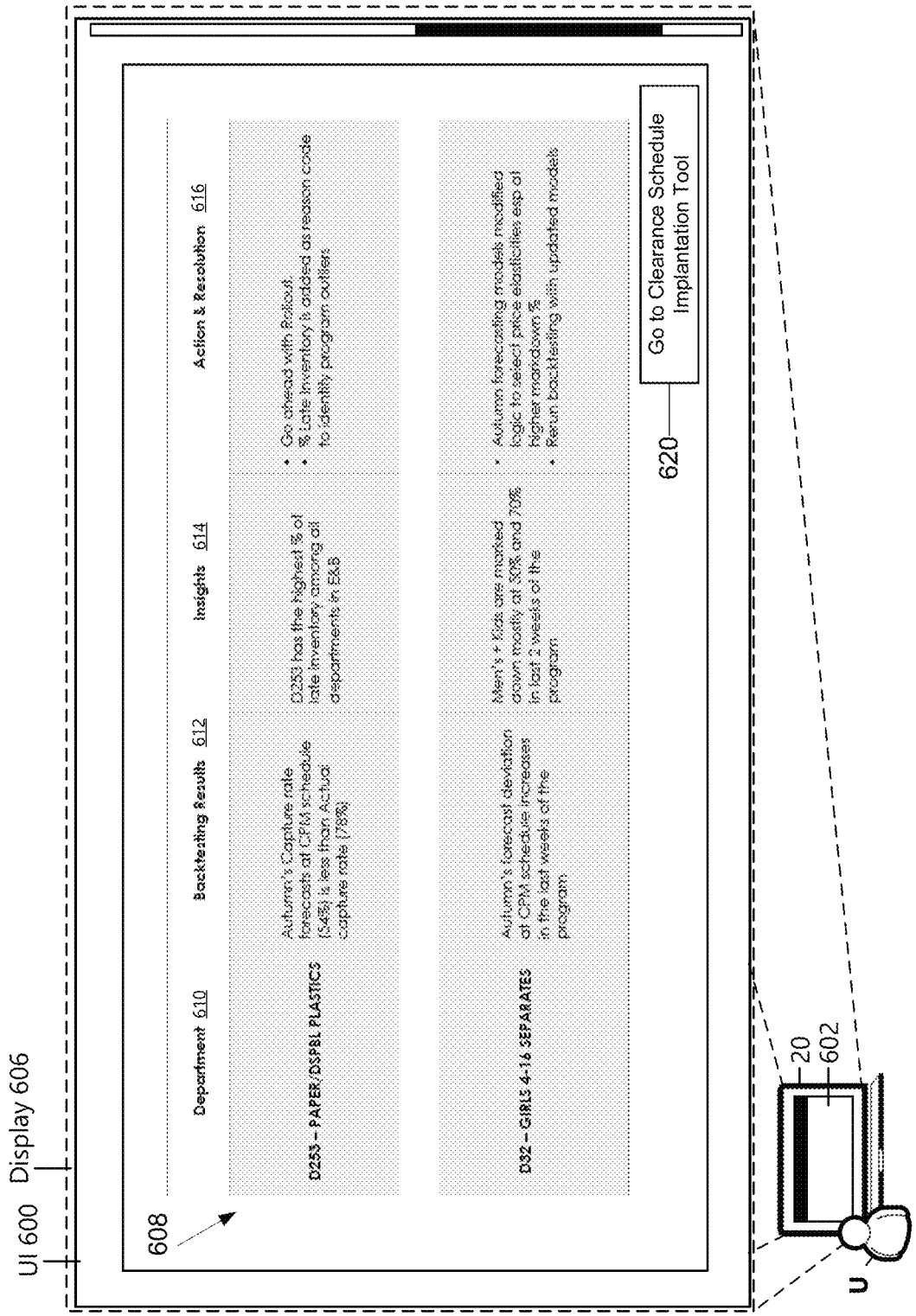
FIG. 6 illustrates an example user interface displaying an output from the in-store clearance management system.

FIG. 6 illustrates an example user interface 600 displaying an output from the in-store clearance management system. The user interface 600 may be presented on a screen 602 of a computing device 20. The user interface may be presented on a display 606 such as a touch screen display. A table 608 may be displayed reflecting results of backtesting. The results may be displayed on a per-department basis 610, and may include backtesting results 612, insights 614, and recommended action and/or resolution 616. The backtesting results 612, for example, may include details reflecting how well the forecasted demand predicted from the optimization model matched actual clearance schedule data. Insights 614 may reflect additional details about an inventory item for clearance learned during the modeling and backtesting phases. The recommended action and/or resolution 616 may include whether, for example, to rollout a clearance program implementing an optimal markdown schedule, or whether to return to backtesting until further trust is built in the models.

The results displayed in exemplary table 608 may be utilized by the retail enterprise for decision making with regard to implementation of a markdown schedule for a clearance program. The user interface 600 may also include a selectable input 620 to launch a downstream clearance schedule implementation tool for implementing an optimal markdown schedule.

Figure 7:
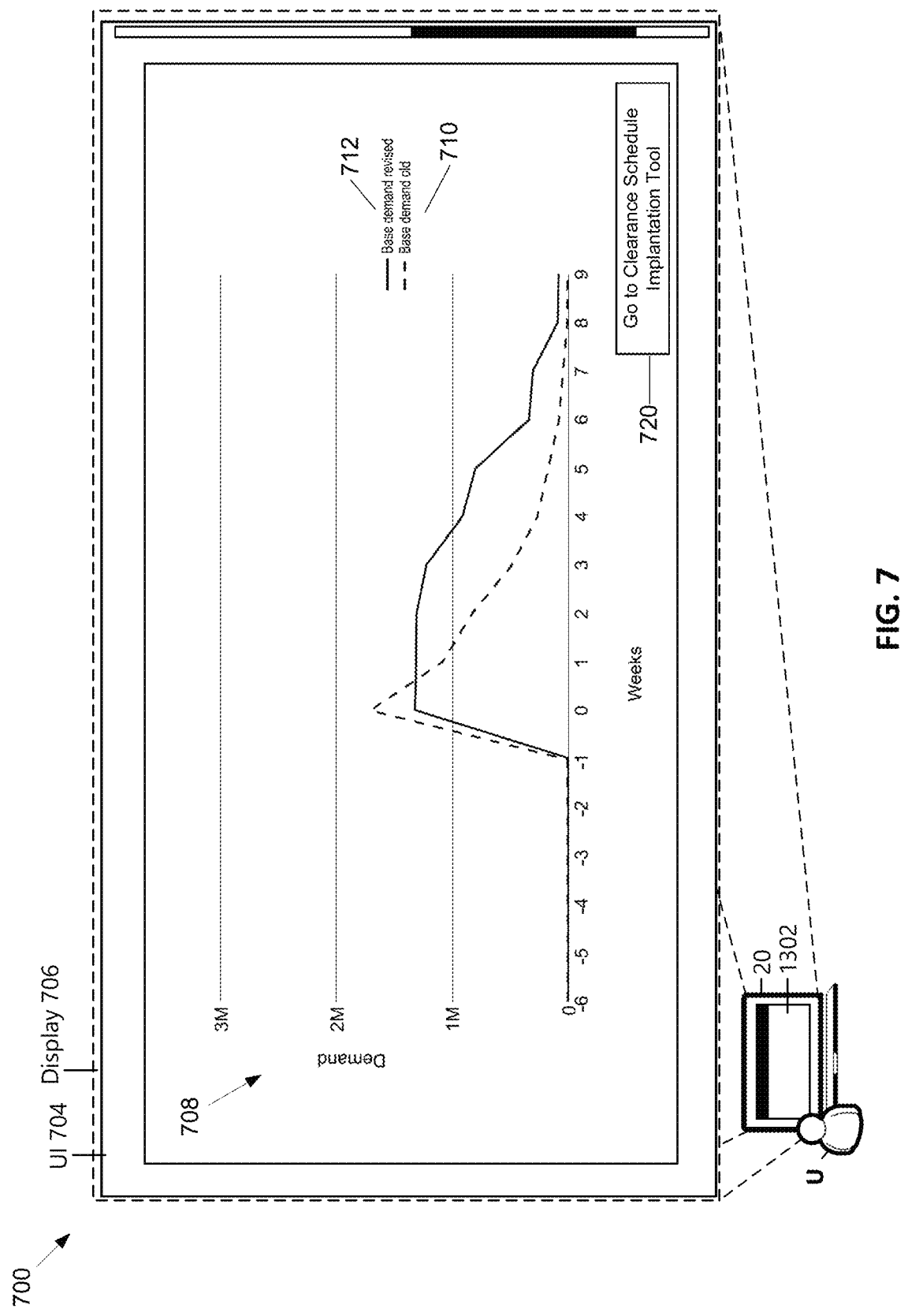
FIG. 7 illustrates an example user interface displaying an output from the in-store clearance management system.

FIG. 7 illustrates an example user interface displaying an output from the in-store clearance management system. The user interface 700 may be presented on a screen 702 of a computing device 20. The user interface may be presented on a display 706 such as a touch screen display. A graphical representation 708 may be displayed reflecting forecasted demand 710 and revised forecasted demand 712 adjusted based on actual sales of the current inventory item during the clearance program. In the example illustrated in FIG. 7, after week 1 of the clearance program, the revised forecasted demand 712 is greater than the demand originally predicted 710. In other examples, the revised forecasted demand may be less than the demand originally predicted. The method for adjusting the forecasted demand based on actual sales during a clearance program is described in greater detail below with respect to FIG. 9. The user interface 700 may also include a selectable input 720 to launch a downstream clearance schedule implementation tool for implementing an optimal markdown schedule.

Figure 8:
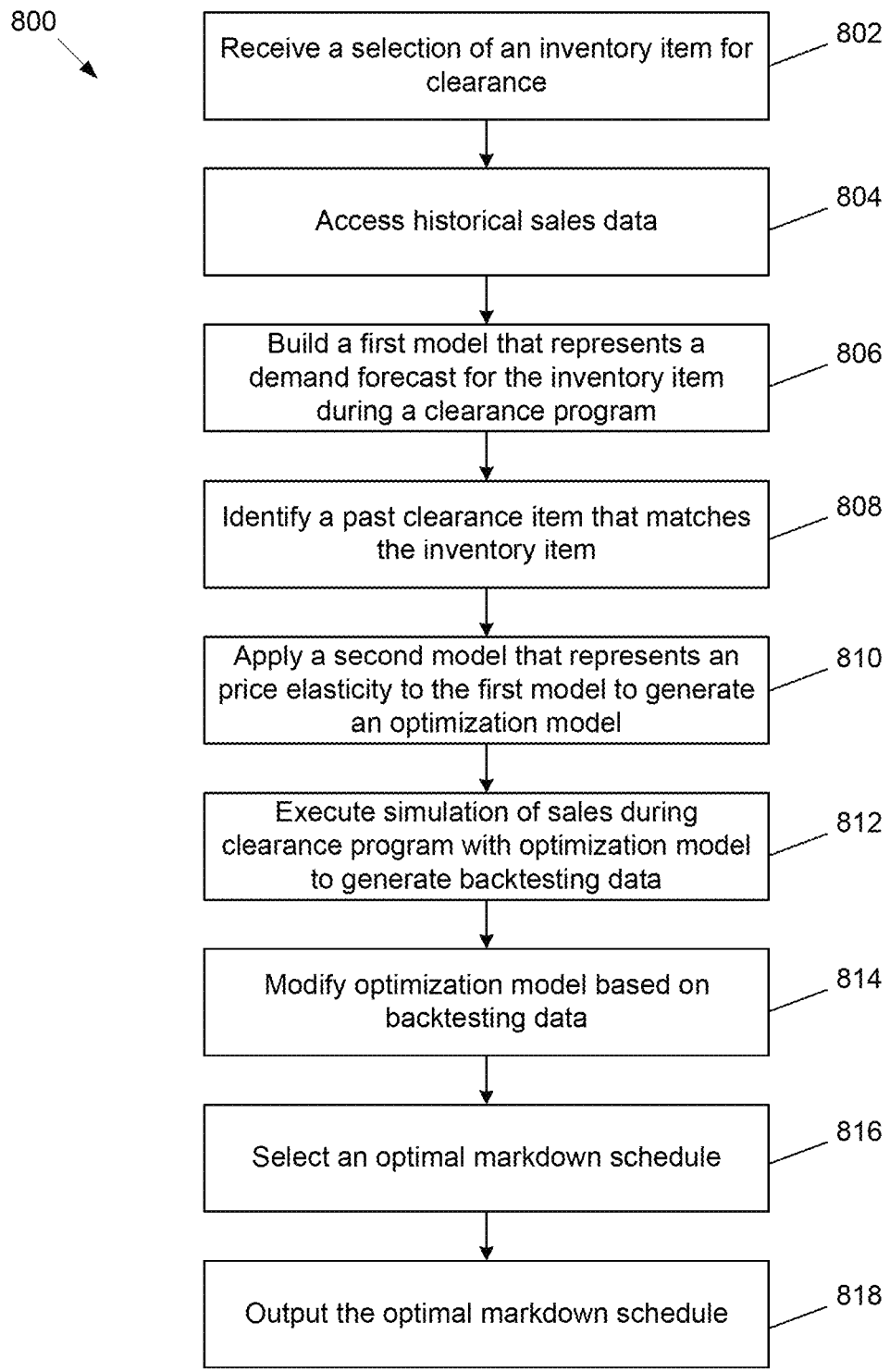
FIG. 8 illustrates an example method for managing an inventory item for in-store clearance.

FIG. 8 illustrates an example method 800 for managing an inventory item for in-store clearance. In examples, the method 800 may be performed by the in-store clearance management system 106 described in detail with reference to FIG. 1.

The method 800 begins at operation 802, where a selection of an inventory item for clearance is received at a clearance schedule tool. The inventory item may be different from past clearance such that it has never been in a clearance program before. At operation 804, historical sales data for the inventory item and historical clearance sales data for a plurality of past clearance items different from the inventory item may be accessed at the clearance scheduling tool. The historical sales data and historical clearance sales data may include price data, item sales data, inventory data, item data, store data, and program data associated with past clearance items. In examples, the historical sales data may be aggregated at an item cluster level. Historical sales data may also be pretreated to adjust for seasonality.

At operation 806, a first model representing a demand forecast for the inventory item during a clearance program is built. The first model may represent demand forecast at the item-cluster level (e.g., for the same item, within a cluster of similar retail locations). The first model may be an exponential smoothing model having a decay component. In examples, the demand forecast may be constrained based on inventory information at a particular retail store. The first model is built based on the historical sales data for the inventory item. In examples, the demand forecast for the inventory item as represented in the first model may be calculated using weighted averages, wherein smaller weights are attached to older historical sales data and larger weights are attached to more recent history sales data for the inventory item. Moreover, in examples, the first model may be trained with historical sales data. The generation of the first model representing a demand forecast for the inventory item is described in more detail with respect to FIG. 3.

At operation 808, a past clearance item that matches the inventory item is identified based on a comparison of item attributes of the inventory item and the plurality of past clearance items. In some examples, a single past clearance item may be identified as matching the current inventory item. In other examples, a plurality of past clearance items may be identified as matching the current inventory item. The similarity between a past clearance item and the current inventory item may be evaluated based on a comparison of item attributes. The step of identifying a past clearance item that matches the inventory item is described in more detail with respect to phase 208 of FIG. 2.

At operation 810, based on the historical sales data for the past clearance item accessed at operation 804, a second model that represents an estimated price elasticity for the inventory item is applied to the first model to generate an optimization model. The second model representing an estimated price elasticity may be generated based on historical sales data for past clearance items. The second model may be a log-log regression model. The optimization model reflects a forecasted demand for the current inventory item for clearance that considers how demand for the inventory item may change based on a reduction in price throughout the clearance program. The generation of the first forecasting model, the second price elasticity model, and the optimization model are described in greater detail with respect to FIG. 3.

At operation 812, historical sales data for the plurality of past clearance items is used to execute simulation of sales during the clearance program for the plurality of past clearance items with the optimization model to generate backtesting data. The backtesting data may be compared to actual sales data from the clearance program for the plurality of past clearance items. Based on the comparison of backtesting data with actual sales data, at operation 814, the optimization model may be modified. The modification of the optimization model at operation 814 may comprise iteratively updating the first and second models until the comparison of the backtesting data with the actual sales data indicates that a predetermined capture rate is met. For example, parameters of the first and second models may be adjusted iteratively (e.g., the damping factor and smoothing parameter of the first model, or the markdown and/or salvage penalties of the second model) until comparison of the backtesting data indicates the predetermined capture rate. The backtesting process and the modification of the optimization model are described in more detail with respect to FIG. 4.

At operation 816, an optimal markdown schedule from a set of possible markdown schedules is selected based on the demand forecast and price elasticity for the inventory item as reflected in the modified optimization model. The selected optimal markdown schedule may maximize revenue obtained for the inventory item for clearance. The selected optimal markdown schedule may be saved in a databased accessible by the clearance schedule tool and the clearance implementation tool. The selection of an optimal markdown schedule is described in more detail with respect to FIG. 2 at phase 216. Moreover, in examples, in response to selecting an optimal markdown schedule at operation 816, the historical sales data may be disaggregated from an item cluster level to an item store level.

In response to selecting an optimal markdown schedule at operation 816, at operation 818, the optimal markdown schedule may be output on a user interface having a selectable feature configured to launch a downstream clearance schedule implementation tool for implementing the optimal markdown schedule, the optimal markdown schedule. In examples, outputting the optimal markdown schedule at operation 816 may include displaying, on a user interface, a graphical representation of predicted sales of the inventory item during the clearance program, wherein the graphical representation includes an indication of a change in the demand forecast based on the selected optimal markdown schedule, which is described in more detail with respect to FIG. 5. In further examples, outputting the optimal markdown schedule at operation 816 may include displaying, on the user interface, the backtesting data and a recommendation for implementing the optimal markdown schedule based on the backtesting data, which is described in more detail with respect to FIG. 6.

Figure 9:
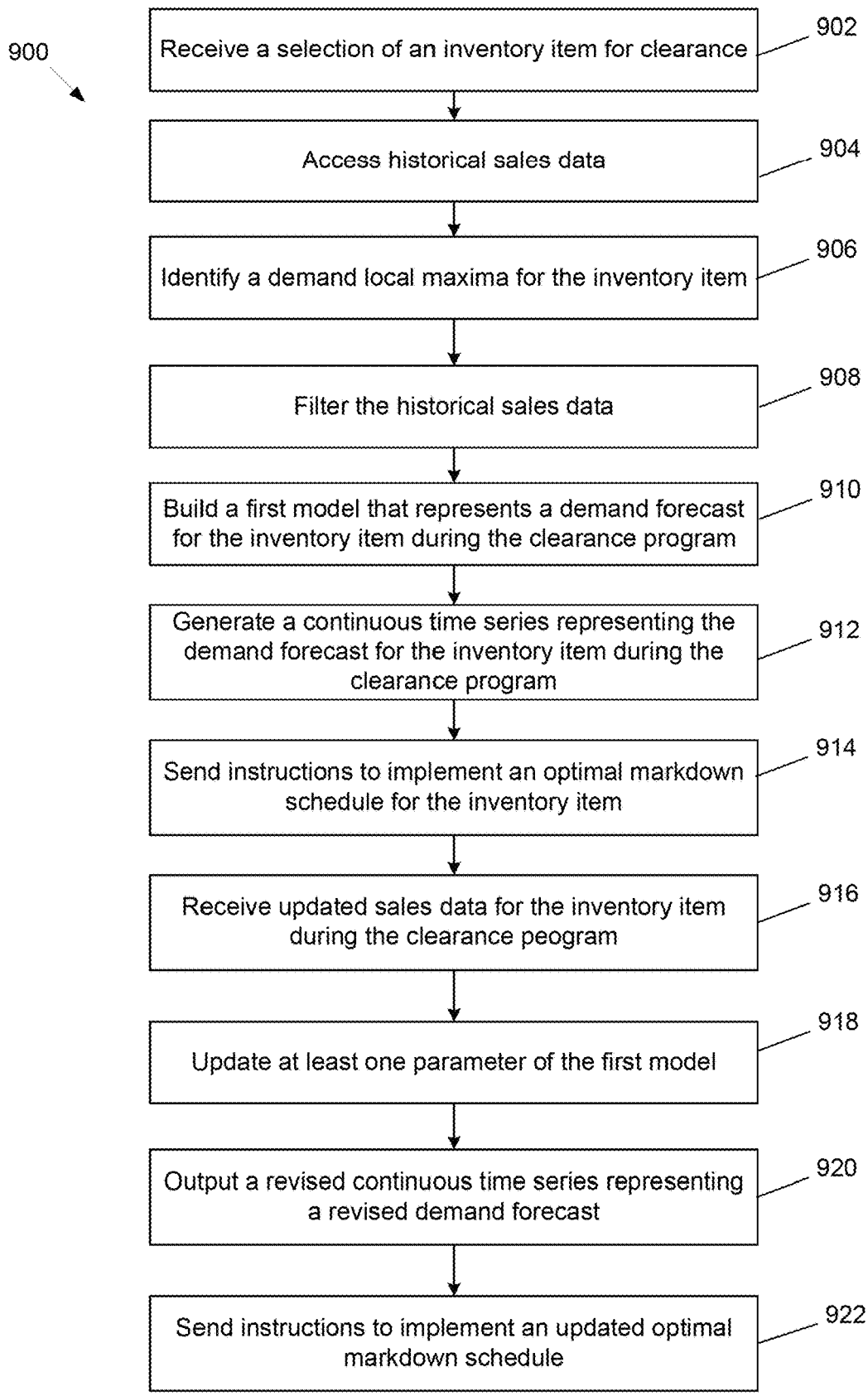
FIG. 9 illustrates an example method for managing an inventory item for in-store clearance.

FIG. 9 illustrates an example method 900 for managing an inventory item for in-store clearance, and more specifically, for revising a demand forecast for an inventory item during a clearance program. At operation 902, a selection of an inventory item for clearance is received at a clearance schedule tool. The inventory item may be different from past clearance such that it has never been in a clearance program before. At operation 904, historical sales data for the inventory item may be accessed. The historical sales data may include sales data for the inventory item for a predetermined period of time leading up to the start of a clearance program. In examples, the historical sales data may include sales data for the twelve-week period leading up to the start of a clearance program. The historical sales data may include price data, item sales data, inventory data, item data, store data, and program data associated with the inventory item.

At operation 906, the historical sales data accessed at operation 904 may be used to identify a local maxima for the inventory item. The local maxima may represent a peak in sales in the time period leading up to the start of the clearance program. For example, where a time period of twelve weeks leading up to clearance is analyzed, the local maxima showing peak sales may be identified at eight weeks before the start of clearance. Based on the identified local maxima reflecting peak sales leading up to the start of clearance, the time series sales trend data may be filtered to only include the data points between the local maxima point and the clearance program start data. In examples, at least five weeks for data points are used as input to the model to prevent bias resulting from the local maxima being too close to the start of the clearance program date.

At operation 908, based on the local maxima identified at operation 906, the historical sales data may be filtered to only include the data points between the local maxima point and the clearance program start data. In examples, at least five weeks for data points are used as input to the model to prevent bias resulting from the local maxima being too close to the start of the clearance program date. Using the filtered historical sales data, a first model may be built at operation 910, wherein the first model represents a demand forecast for the inventory item during the clearance program. In examples, the method 900 may further include splitting the filtered historical sales data into training data and testing data to train and test the first model. The testing data may include the last two values of the historical sales data before the start of the clearance program (e.g., sales data from the last two weeks prior to the start of the clearance program). The training data may be used to calculate optimal values for parameters of the first model. Then, the first model may be tested with the testing data. Building a forecasting model that represents a demand forecast for the inventory item during the clearance program using the filtered historical sales data is described in greater detail with respect to FIG. 3. At operation 912, the first model may be used to generate a continuous time series representing the demand forecast for the inventory item during the clearance program.

In examples, the method 900 may include applying a second model that represents an estimated price elasticity for the inventory item for clearance to the first model. The generation of the second price elasticity model is described in greater detail with respect to FIG. 3.

At operation 914, instructions may be sent to a clearance schedule implementation tool to implement an optimal markdown schedule for the inventory item. The optimal markdown schedule may be selected based on the demand forecast for the inventory item during the clearance program as predicted in the continuous time series model generated at operation 912. In examples, the optimal markdown schedule maximizes revenue obtained for the inventory item for clearance during the clearance program. Selection of an optimal markdown schedule is described in greater detail with respect to FIG. 2 at phase 216.

After the start of the clearance program for the inventory item, at operation 916, the clearance schedule tool may receive updated sales data for the inventory item during the clearance program. The updated sales data may be received automatically on a pre-determined time schedule, such as daily or weekly. In examples, the clearance schedule tool may include an automated feedback dataflow that continuously accesses sales data for the inventory item during the clearance program and receives updates based on changes to sales data. This enables the clearance schedule tool to receive updates dynamically and in real-time regarding sales data for the inventory item during the clearance program. The updated sales data may include data similar to the historical sales data, including, without limitation, price data, item sales data, inventory data, item data, store data, and program data associated with the inventory item.

At operation 918, in response to receiving updated sales data for the inventory item during the clearance program, at least one parameter of the first model may be updated. In examples, parameters of the first model may include a dynamic trend fact, a smoothing factor, and a damping factor. By receiving updated sales data during the clearance program once the optimal markdown schedule has been implemented, the model may be adjusted to improve the accuracy of the forecasted demand for the inventory item using actual sales data. At operation 920, a revised continuous time series may be output representing the revised demand forecast for the inventor item as determined using the first model with at least one updated parameter. In examples, the continuous time series and the revised continuous time series may be displayed concurrently on a user interface, such as in the example illustrated in FIG. 7. In examples, the method 900 may further include comparing the continuous time series and the revised continuous time series to calculate a weekly error rate. Both the continuous time series and the revised continuous time series may be saved in a database accessible by the clearance schedule tool and the clearance implementation tool.

At operation 922, instructions may be sent to the clearance schedule implementation tool to implement an updated optimal markdown schedule for the inventory item based on the revised demand forecast.

Figure 10:
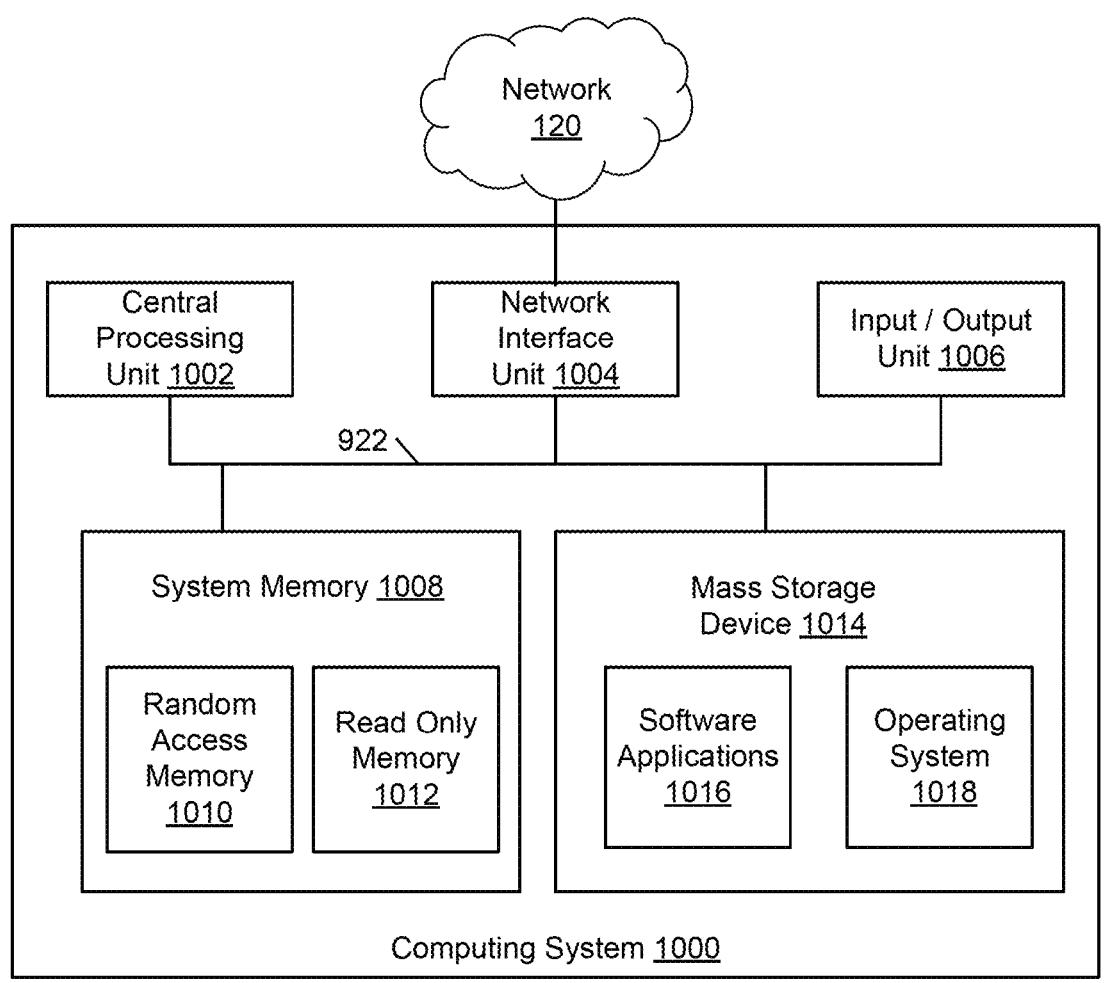
FIG. 10 illustrates an example computing device usable to implement aspects of the present disclosure.

FIG. 10 illustrates an example block diagram of a virtual or physical computing system 1000. One or more aspects of the computing system 1000 can be used to implement the in-store clearance management system 106, retail server service 102, or other computing systems described above in conjunction with FIG. 1.

In the embodiment shown, the computing system 1000 includes one or more processors 1002, a system memory 1008, and a system bus 1022 that couples the system memory 1008 to the one or more processors 1002. The system memory 1008 includes RAM (Random Access Memory) 1010 and ROM (Read-Only Memory) 1012. A basic input/output system that contains the basic routines that help to transfer information between elements within the computing system 1000, such as during startup, is stored in the ROM 1012. The computing system 1000 further includes a mass storage device 1014. The mass storage device 1014 is able to store software instructions and data. The one or more processors 1002 can be one or more central processing units or other processors.

The mass storage device 1014 is connected to the one or more processors 1002 through a mass storage controller (not shown) connected to the system bus 1022. The mass storage device 1014 and its associated computer-readable data storage media provide non-volatile, non-transitory storage for the computing system 1000. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1000.

According to various embodiments of the invention, the computing system 1000 may operate in a networked environment using logical connections to remote network devices through the network 1020. The network 1020 is a computer network, such as an enterprise intranet and/or the Internet. The network 1020 can include a LAN, a Wide Area Network (WAN), the Internet, wireless transmission mediums, wired transmission mediums, other networks, and combinations thereof. The computing system 1000 may connect to the network 1020 through a network interface unit 1004 connected to the system bus 1022. It should be appreciated that the network interface unit 1004 may also be utilized to connect to other types of networks and remote computing systems. The computing system 1000 also includes an input/output controller 1006 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1014 and the RAM 1010 of the computing system 1000 can store software instructions and data. The software instructions include an operating system 1018 suitable for controlling the operation of the computing system 1000. The mass storage device 1014 and/or the RAM 1010 also store software instructions, that when executed by the one or more processors 1002, cause one or more of the systems, devices, or components described herein to provide functionality described herein. For example, the mass storage device 1014 and/or the RAM 1010 can store software instructions that, when executed by the one or more processors 1002, cause the computing system 1000 to receive and execute managing network access control and build system processes.

In accordance with the present disclosure, and as reflected in the embodiments below, the present in-store clearance management system has a number of technical advantages over existing systems. In particular, referring to FIGS. 1-10 overall, the clearance schedule tool provides an advantageous tool for efficient and accurate predication of item demand for an inventory item in a clearance program in order to select an optimal markdown schedule to maximize revenue from sales of the inventory item while on clearance. For example, the generation of a pre-clearance time series model and a price elasticity model based on historical clearance sales data of past clearance items similar to the inventory item generates an optimization model that improves the accuracy of forecasted demand. The backtesting process to build trust in the model further improves the accuracy of the forecasted demand by iteratively updating parameters of the optimization model until the comparison of the backtesting data with actual historical clearance sales data indicates that a predetermined capture rate is met. Moreover, once the clearance program is implemented with an optimal markdown schedule, an automated feedback dataflow may continuously access sales data for the inventory item during the clearance program and receive updates based on changes to sales data. This provides improvements over existing systems by enabling the clearance schedule tool to receive updates dynamically and in real-time regarding sales data for the inventory item during the clearance program such that the forecasted baseline demand may be dynamically updated in response to receiving actual clearance sales data for the inventory item. Revising the continuous time series during the clearance program based on actual sales data for the inventory item to generate a revised demand forecast provides even further improvements to the accuracy of the forecasted demand. By improving the accuracy of the forecasted demand, an optimal clearance markdown schedule can be selected, and adjusted during the clearance program if a more optimal clearance markdown schedule is realized, that maximizes revenue of sales of the inventory item during clearance. The resulting forecasted demand from the clearance schedule tool has a downstream effect in a broader clearance management system, and ay be used for a retail enterprise for decision making related to expense planning, inventory planning, and clearance program implementation. Indeed, the clearance schedule tool is configured to output results in formats useful to a large retail enterprise and other downstream systems for use in managing in-store clearance. For example, user interfaces may be generated that display recommended actions with respect to whether a clearance rollout should occur and/or a selectable feature configured to launch an application for downstream implementation of an optimal markdown schedule selected from the clearance schedule tool's generation of demand forecasts.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method for managing an inventory item for in-store clearance, the method comprising:
   receiving, at a clearance schedule tool, a selection of an inventory item for clearance;
   accessing, at the clearance scheduling tool, historical sales data for the inventory item for a predetermined time period before a start of a clearance program;
   using the historical sales data, identifying a demand local maxima for the inventory item;
   based on the demand local maxima, filtering the historical sales data to include data between the demand local maxima and the start of the clearance program;
   based on the filtered historical sales data, building a first model that represents a demand forecast for the inventory item during the clearance program, wherein building the first model comprises:
      splitting the filtered historical sales data into training data and testing data;
      using the training data in a first stage to calculate optimal values for parameters of the first model; and
      in response to calculating optimal values for parameters of the first model, testing the first model with the testing data;
   generating a continuous time series representing the demand forecast for the inventory item during the clearance program as determined using the first model;
   sending instructions to a clearance schedule implementation tool to implement an optimal markdown schedule for the inventory item based on the demand forecast for the inventory item during the clearance program;

automatically receiving in real-time, at the clearance schedule tool, updated sales data for the inventory item during the clearance program, wherein the clearance schedule tool includes an automated feedback dataflow that continuously accesses sales data for the inventory item during the clearance program and receives updates based on changes to sales data;

in response to receiving updated sales data, training the first model in a second stage using the updated sales data;

updating at least one parameter of the first model based on training the first model in the second stage;

generating a revised continuous time series representing a revised demand forecast for the inventory item during the clearance program as determined using the first model with the updated at least one parameter;

concurrently displaying, on a user interface, a graphical representation of the continuous time series and the revised continuous time series;

generating, on the user interface, an interactive selectable input configured to launch the downstream clearance schedule implementation tool for implementing the optimal markdown schedule; and sending instructions to the clearance schedule implementation tool to implement an updated optimal markdown schedule for the inventory item based on the revised demand forecast for the inventory item during the remainder of the clearance program.

2. The method of claim 1, wherein the historical sales data is weekly sales data and the testing data includes the last two values of the filtered historical sales data before the start of the clearance program.

3. The method of claim 1, wherein the parameters of the first model include a dynamic trend factor, a smoothing factor, and a damping factor.

4. The method of claim 1, further comprising:
applying a second model that represents an estimated price elasticity for the inventory item for clearance to the first model.

5. The method of claim 1, further comprising:
generating a set of possible markdown schedules for the inventory item for clearance, each possible markdown schedule of the set defining a set of prices and associated price durations; and
in response to outputting the revised continuous time series, generating an updated set of possible markdown schedules.

6. The method of claim 1, wherein the clearance program is an in-store clearance program.

7. The method of claim 1, further comprising:
aggregating the historical sales data at an item cluster level; and
in response to sending instructions to the clearance schedule implementation tool to implement the optimal markdown schedule, disaggregating the historical sales data from an item cluster level to an item store level.

8. The method of claim 1, further comprising:
comparing the continuous time series and the revised continuous time series to calculate a weekly error rate.

9. The method of claim 1, further comprising:
saving the continuous time series and the revised continuous time series in a database accessible by the clearance schedule tool and the clearance implementation tool.

10. The method of claim 1, wherein updated sales data for the inventory item is automatically received weekly during the clearance program.

11. A system for managing an inventory item for clearance, the system comprising:
a computing system including a processor, and a memory communicatively coupled to the processor, the memory storing instructions executable by the processor to:
receive, at a clearance schedule tool, a selection of an inventory item for clearance;
access, at the clearance scheduling tool, historical sales data for the inventory item for a predetermined time period before a start of a clearance program;
using the historical sales data, identify a demand local maxima for the inventory item;
based on the demand local maxima, filter the historical sales data to include data between the demand local maxima and the start of the clearance program;
based on the filtered historical sales data, build a first model that represents a demand forecast for the inventory item during the clearance program, wherein building the first model comprises:
splitting the filtered historical sales data into training data and testing data;
using the training data in a first stage to calculate optimal values for parameters of the first model; and
in response to calculating optimal values for parameters of the first model, testing the first model with the testing data;
generate a continuous time series representing the demand forecast for the inventory item during the clearance program as determined using the first model;
send instructions to a clearance schedule implementation tool to implement an optimal markdown schedule for the inventory item based on the demand forecast for the inventory item during the clearance program;
automatically receive in real-time, at the clearance schedule tool, updated sales data for the inventory item during the clearance program, wherein the clearance schedule tool includes an automated feedback dataflow that continuously accesses sales data for the inventory item during the clearance program and receives updates based on changes to sales data;
in response to receiving updated sales data, train the first model in a second stage using the updated sales data;
update at least one parameter of the first model based on training the first model in the second stage;
generate a revised continuous time series representing a revised demand forecast for the inventory item during the clearance program as determined using the first model with the updated at least one parameter;
concurrently display, on a user interface, a graphical representation of the continuous time series;
generate, on the user interface, an interactive selectable input configured to launch the downstream clearance schedule implementation tool for implementing the optimal markdown schedule; and
send instructions to the clearance schedule implementation tool to implement an updated optimal markdown schedule for the inventory item based on the revised demand forecast for the inventory item during the remainder of the clearance program.

12. The system of claim 11, wherein the historical sales data is weekly sales data and the testing data includes the last two values of the filtered historical sales data before the start of the clearance program.

13. The system of claim 11, wherein the instructions stored in the memory are further executable by the process to:
apply a second model that represents an estimated price elasticity for the inventory item for clearance to the first model.

14. The system of claim 11, wherein the clearance program is an in-store clearance program.

15. The system of claim 11, wherein updated sales data for the inventory item is automatically received weekly during the clearance program.

16. A method for managing an inventory item for clearance, the method comprising:
receiving, at a clearance schedule tool, a selection of an inventory item for clearance;
accessing, at the clearance scheduling tool, historical sales data for the inventory item for a predetermined time period before a start of a clearance program;
using the historical sales data, identifying a demand local maxima for the inventory item;
based on the demand local maxima, filtering the historical sales data to include data between the demand local maxima and the start of the clearance program;
based on the filtered historical sales data, building a first model that represents a demand forecast for the inventory item during the clearance program, wherein building the first model comprises:
splitting the filtered historical sales data into training data and testing data;
using the training data to calculate optimal values for parameters of the first model; and
in response to calculating optimal values for parameters of the first model, testing the first model with the testing data;
generating a continuous time series representing the demand forecast for the inventory item during the clearance program as determined using the first model;
sending instructions to a clearance schedule implementation tool to implement an optimal markdown schedule for the inventory item based on the demand forecast for the inventory item during the clearance program;
automatically receiving in real-time, at the clearance schedule tool, updated sales data for the inventory item during the clearance program, wherein the clearance schedule tool includes an automated feedback dataflow that continuously accesses sales data for the inventory item during the clearance program and receives updates based on changes to sales data;
in response to receiving updated sales data, training the first model in a second stage using the updated sales data;
updating at least one parameter of the first model based on the training the first model in the second stage;
generating a revised continuous time series representing a revised demand forecast for the inventory item during the clearance program as determined using the first model with the updated at least one parameter;
concurrently displaying, on a user interface, a graphical representation of the continuous time series and the revised continuous time series;
generating, on the user interface, an interactive selectable input configured to launch the downstream clearance schedule implementation tool for implementing the optimal markdown schedule; and
sending instructions to the clearance schedule implementation tool to implement an updated optimal markdown schedule for the inventory item based on the revised demand forecast for the inventory item during the remainder of the clearance program.

* * * * *